United States Patent [19]

Franks

[11] 4,131,259

[45] Dec. 26, 1978

[54] SWINGING CUP HOLDER

[76] Inventor: Peter Franks, 77 Anglesey Blvd., Toronto, Ontario, Canada

[21] Appl. No.: 795,638

[22] Filed: May 10, 1977

[51] Int. Cl.² .............................................. A01G 9/02
[52] U.S. Cl. .............................. 248/311.1 R; 211/75; 211/88
[58] Field of Search ..................... 248/311.1, 318, 278; 211/75, 81, 88, 96, 97, 110, 116; 47/67; 224/42.45 R, 42.46 R

[56] References Cited

U.S. PATENT DOCUMENTS

| | | | |
|---|---|---|---|
| 313,667 | 3/1885 | Hesser | 248/318 |
| 387,082 | 7/1888 | Lemberger | 248/311.1 |
| 764,042 | 7/1904 | Cobbett | 248/318 |
| 1,345,252 | 6/1920 | Rubin | 248/311.1 X |
| 2,591,318 | 4/1952 | Tomeo | 248/278 X |
| 2,809,760 | 10/1957 | Clark | 248/311.1 X |
| 3,329,385 | 7/1967 | Dietsch | 211/96 X |
| 3,761,044 | 9/1973 | Ahmer | 248/311.1 |
| 3,978,612 | 9/1976 | Young | 47/67 X |

FOREIGN PATENT DOCUMENTS 961081 6/1964 United Kingdom ..................... 248/318

Primary Examiner—J. Franklin Foss

[57] ABSTRACT

A suspension holder for a beverage cup or other container comprises a support member terminating in a hook or eye removably receiving a hook formed at the upper end of a hanger/cup-holder formed from a single length of wire and comprising an offset spine, a cup-encircling ring and a supporting base. By positioning the hanger hook generally axially relative to both the cup-encircling ring and the base, the cup-holder does not tip on insertion or removal of a cup. The support arm is pivotally mounted on a bracket formed with a number of a separate recesses to permit positioning of the arm in any one of a number of predetermined positions.

6 Claims, 6 Drawing Figures

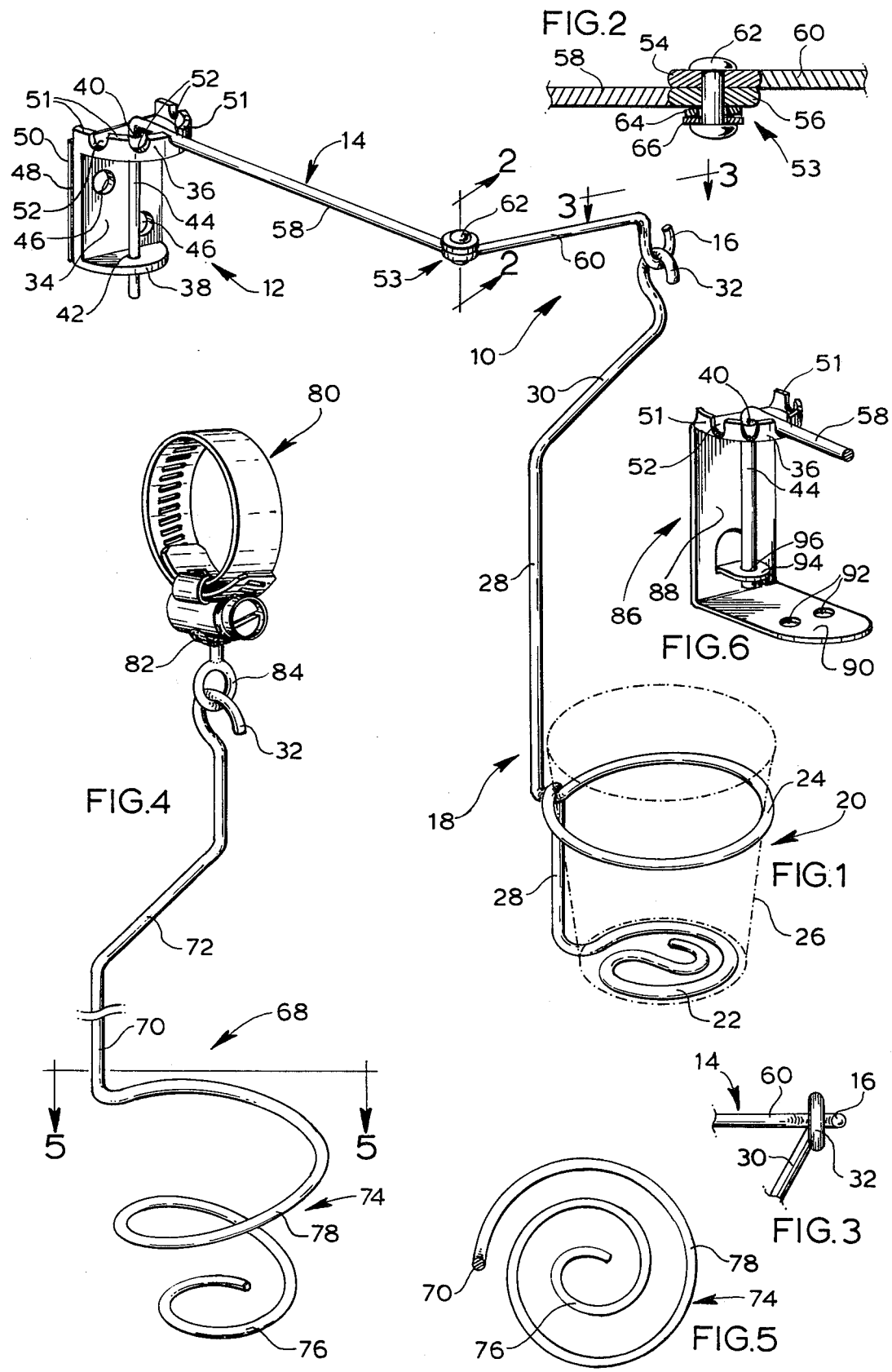

SWINGING CUP HOLDER

BACKGROUND OF THE INVENTION

The present invention relates to a suspension holder particularly intended for supporting a beverage cup or other container with reduced risk of spillage of the contents of such cup or container on movement of a structural member on which such holder is mounted. The invention is especially applicable to holders intended for use in automobiles, boats, airplanes and other vehicles.

Various holders for the aforesaid purpose have heretofore been proposed but the previously proposed holders have presented certain practical disadvantages. For example, some of the known holders have been relatively expensive in their construction and, therefore, have had a somewhat limited marketability.

Other known holders for the specified purpose have presented functional problems in that they have had such structures that they tip when a container is inserted or removed.

It is a principal object of this invention to provide a suspension holder which is highly effective in meeting the basic operating requirements for use in a moving vehicle.

It is a further object of this invention to provide a suspension holder having a particularly simple and, therefore, inexpensive construction.

Other objects of the invention will become apparent as the description herein proceeds.

SUMMARY OF THE INVENTION

Broadly, the present invention provides a suspension holder particularly intended for a beverage cup and which comprises a mounting member adapted to be secured upon a structural member, a support member extending from said mounting member and formed at its free end with a coupling member, a hanger comprising a linear spine portion and an upper portion extending from an upper end of said spine angularly with respect thereto and adapted at its free end releasably and supportedly to engage said coupling member, and a cup-holder secured to said spine portion of said hanger and comprising a supporting base and an encircling ring disposed upwardly of said base and between said base and said free end of said hanger upper portion and said free end of said hanger upper portion being disposed generally axially relative to said encircling ring.

Usefully, the support member of a suspension holder in accordance with this invention is in the form of a support arm which is rotatably mounted on the mounting member to permit rotation of the arm in a generally horizontal plane about a generally vertical axis. Additionally, such a support arm is usefully provided between its ends with a pivot means to permit relative pivoting of two separate parts of that arm and even greater flexibility in positioning the hanger.

A suspension holder in accordance with this invention can readily be manufactured, with the exception of its mounting bracket, from wire or other appropriate elongated material.

Other features of the invention and the advantages presented thereby will become apparent as the description herein proceeds.

BRIEF DESCRIPTION OF THE DRAWINGS

The invention will now be described merely by way of illustration with reference to the accompanying drawings in which:

FIG. 1 is a perspective illustration and one embodiment of a suspension holder in accordance with this invention;

FIG. 2 is an enlarged and fragmentary sectional view through a pivot means usefully provided in the support arm of the suspension holder shown in FIG. 1 when taken as indicated by the arrows 2—2 of that figure;

FIG. 3 is a fragmentary plan view when taken as indicated by the arrows 3—3 of FIG. 1;

FIG. 4 is a fragmentary perspective view of an alternative embodiment of a suspension holder;

FIG. 5 is a sectional plan view when taken as indicated by the arrows 5—5 in FIG. 4; and FIG. 6 is a perspective view of an alternative mounting bracket for use with a suspension holder according to the invention.

DESCRIPTION OF THE PREFERRED EMBODIMENTS

In FIG. 1, there is indicated generally at 10 a suspension holder according to this invention. It comprises a mounting member or bracket generally indicated at 12 and on which there is rotatably mounted a support arm generally indicated at 14. At the free end of the arm 14, there is provided a coupling member in the form of a suspension hook 16 from which there is removably suspended a hanger generally indicated at 18.

The suspension holder 10 also comprises a cup-holder generally indicated at 20 and comprising a supporting base 22 and an encircling ring 24 so that a beverage cup shown in phantom outline at 26 can be supported therein.

In the embodiment 10 of a suspension holder in accordance with this invention as shown in FIG. 1 of the accompanying drawings, the hanger 18 and the cup-holder 20 are integrally formed from a single length of relatively rigid wire-type material which will, for convenience, be referred to hereinafter as "wire". It should, however, be understood that the invention is in no way restricted to the use of elongated metallic material as is conventionally considered to constitute wire. It is, for example, equally possible to form the hanger and cup-holder from other materials, such as plastics materials, and from elongated materials of other configurations. For example, such component parts could be formed from a strip material.

It will be seen from FIG. 1 that such a length of wire is formed so as to provide a linear hanger spine portion 28 and a hanger upper portion 30 which extends angularly from the upper end of the spine portion 28 and terminates at its upper free end in a hook 32 removably received over the aforementioned suspension hook 16 at the end of the support arm 14.

At the lower end of the spine portion 28 of the hanger 18, the wire thereof is formed into a generally spiral configuration to form the aforementioned supporting base 22.

Above the supporting base 22, the wire of the hanger 18 is formed to provide the cup-encircling ring 24 as will readily be understood by reference to FIG. 1.

It is important to note that the suspension hook 16 on the end of the supporting arm 14 and the hook 32 on the hanger upper portion 30 are disposed generally axially relative to both the encircling ring 24 and the supporting base 22. This is important since it means that the centre of gravity of a cup containing a beverage or other material within the holder will be disposed directly below the hooks 16 and 32. Consequently, when such a cup is placed in the holder 10, it does not cause the hanger 18 to tip.

Additionally, it is useful to note that the spacing between the encircling ring 24 and the hanger upper portion 30 is sufficient to permit unobstructed insertion and removal of a cup such as cup 26.

With further reference to FIG. 1, it will be seen that the mounting bracket 12 comprises a backing plate 34 formed with upper and lower mutually spaced apart projecting flanges 36 and 38 respectively. Openings 40 and 42 are provided in the flanges 36 and 38 respectively for slidably and rotatably receiving a downturned end portion 44 of the support arm 14 so that the last-mentioned member can be rotated to a desired position with the arm 14 supportedly resting on the upper flange 36. The mounting bracket is provided in its backing plate 34 with screw holes 46 and on the rear surface of that backing plate 34 with a coating 48 of an adhesive material temporarily protected by a protective sheet 50 to provide a choice of mounting features.

In accordance with an optional but useful feature of this invention, the upper flange 36 of the mounting bracket 12 is formed with a plurality of mutually spaced upstanding lugs 51 defining therebetween recesses 52 in any one of which the support arm 14 can be disposed. It will now be understood that, by raising the support arm 14, that arm can then be rotated to any one of a number of desired positions and then lowered into a corresponding one of the recesses 52 so that it is then effectively locked in that position.

In accordance with another useful but optional feature of this invention, the support arm 14 is provided between the mounting bracket 12 and the suspension hook 16 with a pivot means generally indicated at 53, shown in greater detail in FIG. 2 and which provides even greater adjustability for the position of the suspension hook 16 relative to a structural member (not shown) on which the mounting bracket 12 is secured.

The pivot means 53 comprises two disc-like members 54 and 56 suitably secured onto ends of inner and outer sections 58 and 60 respectively of the support arm 14. A rivet 62 extends through the disc-like members 54 and 56 and a spring washer 64 and flat washer 66 are provided to prevent undesired relative rotation of the two arm sections 58 and 60. It will be understood that, when a pivot means such as that indicated at 53 is provided, the force applied by the spring washer 64 will be such as to allow relative rotation of the arm sections 58 and 60 when the inner section 58 is disposed in one of the recesses 52 but, when the arm 14 is raised out of such recess, that arm will rotate freely about the axis of its downturned end portion 44 and not at the pivot means 53.

In accordance with yet another optional feature of this invention, the hook 32 provided at the top end of the hanger upper portion 30 is disposed (FIG. 3) in a vertical plane which is angularly disposed with respect to the vertical plane containing the spine portion 28 and the upper portion 30 of the hanger 18. By offsetting the hook 32 in this manner, more accessible positioning of the holder is ensured.

The description herein will now proceed with reference to FIGS. 4 and 5 which show generally at 68 an alternative embodiment for a suspension holder in accordance with this invention.

The structure shown in FIGS. 4 and 5 is formed from a single length of wire and comprises a hanger spine portion shown fragmentarily at 70, a hanger upper portion 72 having a terminal hook 32 and a cup-holder generally indicated at 74 and having a generally helical configuration with a downwardly reducing diameter, the lowermost turn 76 of the helix providing a cup-supporting base and the higher turns indicated at 78 effectively providing a cup-encircling ring. This particular structure has the added advantage that it may be formed from a more flexible wire than that shown in FIG. 1 with less risk of tilting of the cup-holder 74.

The suspension holder shown in FIG. 4 comprises a conventional worm-drive hose clamp generally indicated at 80 and to which there is secured, for example, by soldering as indicated at 82, an eyebolt 84 which then constitutes the aforesaid coupling member.

Reference will finally be made to FIG. 6 in which there is indicated generally at 86 an alternative structure for a mounting bracket to be used with a suspension holder in accordance with this invention.

The bracket 86 is generally similar to the bracket 12 already described but is modified to allow it to be mounted on top of a horizontal surface (not shown). To avoid undue duplication of the description herein, identical components of the two brackets 12 and 86 are identified by the same legends.

The bracket 86 differs from the bracket 12 in that it comprises a backing plate 88 and a lower flange 90, two screw holes 92 being provided in that lower flange.

A tongue 94 stamped from the backing plate 88 to project forwardly therefrom is formed with an opening 96 receiving the end portion 44 of the support arm 14 as will be readily understood from FIG. 6.

While the present invention has hereinbefore been specifically described with reference to the particular embodiments thereof as shown in the accompanying drawings, it should be appreciated that numerous variations and modifications in the described structure are possible within the scope of this invention. It should also be understood that, when reference is made herein to "generally vertical" and "generally horizontal" members and directions, such references are intended merely to indicate the approximate orientation of such members. For example, while the support arm 14 might be referred to as being "generally horizontal" and as moving in a "generally horizontal plane", that arm might well be angularly disposed to true horizontal during use. For example, if the mounting bracket 12 is secured to a generally vertical structural member of an automobile, boat or other vehicle, tilting of such a vehicle will cause the support arm 14 similarly to be tilted. Regardless of such tilting, the hanger 18 will, however, remain essentially vertical and so will prevent spilling of the contents of a cup or container placed in the holder of the invention.

What is claimed is:

1. A suspension holder for a beverage cup and which comprises;

a mounting member adapted to be secured upon a structural member and having upper and lower flanges extending in a generally horizontal manner therefrom, registering opening means formed in said upper and lower flanges, upstanding lug means formed around said upper flange, and defining therebetween a plurality of recesses spaced radially around said opening;

a support member comprising elongated arm means, and joint means incorporating pivot means whereby a portion of said elongated arm means may be swung relative to another portion thereof, and a generally vertical leg at an inner end of said elongated arm means, shaped and dimensioned to fit rotatably within said registering openings in said upper and lower flanges, and an adjacent portion of said elongated arm means being shaped and dimensioned to fit between two adjacent said lug means whereby to secure said elongated arm means in a predetermined rotational position relative to said mounting means, and being adjustable between said rotational positions by raising of said leg means and swinging of said arm means into a new position between two further said lug means;

coupling means at the free end of said elongated arm means;

a hanger comprising a linear spine portion and an upper portion extending from an upper end of said spine angularly upwardly with respect thereto;

releaseable hook means at the upper end of said hanger, being releaseably interengeable with said coupling means whereby said hanger may be suspended therefrom, and, a cup-holder secured to the lower end of said spine portion of said hanger, and said hook means on the upper end of said hanger being disposed generally axially relative to said cup holder.

2. A suspension holder as claimed in claim 1 and in which said hanger and said cup-holder are integrally formed from a single length of relatively rigid wire-like material.

3. A suspension holder as claimed in claim 2 and in which said length of relatively rigid wire-like material is formed at the lower end of said spine portion into a helix-like configuration having a downwardly reducing diameter thereby to provide both said encircling ring and said supporting base.

4. A suspension holder as claimed in claim 2 and in which said length of relatively rigid wire-like material is deformed above the lower end of said spine portion so to provide said encircling ring and at the lower end of said spine portion into a generally spiral configuration so to provide said supporting base.

5. A suspension holder as claimed in claim 4, in which said hook-like member has a generally vertical major plane and in which the axis of said encircling ring is offset from that major plane.

6. A suspension holder as claimed in claim 5 and in which said coupling member is in the form of a hook.

* * * * *